(12) United States Patent  (10) Patent No.: US 8,917,212 B2
Prather  (45) Date of Patent: Dec. 23, 2014

(54) ANTENNA VERIFICATION VIA TRANSMITTER

(75) Inventor: Scott D. Prather, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 456 days.

(21) Appl. No.: 13/179,271

(22) Filed: Jul. 8, 2011

(65) Prior Publication Data

US 2013/0009830 A1    Jan. 10, 2013

(51) Int. Cl.
*G01R 29/08* (2006.01)
*H04B 17/00* (2006.01)

(52) U.S. Cl.
CPC .................................. *H04B 17/0002* (2013.01)
USPC ........................................ 343/703; 455/562.1

(58) Field of Classification Search
USPC ...................... 455/562.1, 11.1; 370/216, 242; 340/10.4; 343/703
See application file for complete search history.

(56) References Cited

U.S. PATENT DOCUMENTS

| | | | |
|---|---|---|---|
| 6,978,126 B1 | 12/2005 | Blaker | |
| 7,035,609 B1 | 4/2006 | Fry | |
| 7,349,673 B2 | 3/2008 | Moloudi | |
| 7,697,900 B2 | 4/2010 | Moloudi | |
| 7,840,200 B2 | 11/2010 | Kang | |
| 7,848,386 B2 | 12/2010 | Rofougaran | |
| 7,904,118 B2 | 3/2011 | Hovers | |
| 2008/0238629 A1* | 10/2008 | Gonikberg | 340/10.4 |
| 2009/0027282 A1* | 1/2009 | Finn et al. | 343/703 |
| 2010/0255792 A1 | 10/2010 | Moloudi | |
| 2012/0127852 A1* | 5/2012 | Gonikberg | 370/216 |

* cited by examiner

*Primary Examiner* — Phuoc H Doan
(74) *Attorney, Agent, or Firm* — Hartman & Citrin LLC (57) ABSTRACT

Devices, systems, and methods are disclosed which relate to verifying an antenna via a transmitter. A logical interface coupled to a transmitter reads antenna specifications from a memory integrated with an antenna, and refuses transmission when the antenna attributes conflict with the requirements of the transmitter.

17 Claims, 9 Drawing Sheets

ANTENNA VERIFICATION VIA TRANSMITTER

BACKGROUND OF THE SUBJECT DISCLOSURE

1. Field of the Subject Disclosure

The present subject disclosure relates to antenna verification. More specifically, the present subject disclosure relates to antenna verification via the transmitter or transceiver of a wireless communication device.

2. Background of the Subject Disclosure

In today's world of Machine-to-Machine (M2M) radio communication devices, a wireless transceiver is embedded in several types of devices. For example, municipalities are deploying parking meters which contain a cellular radio transceiver. The parking meter uses this transceiver to communicate information concerning available parking locations, amount of money deposited, meter expiration, mechanical faults, etc., back to a central monitoring office.

Manufacturers of these wireless-capable parking meters are typically looking for the widest possible market for these devices. As a result, if units are selling well in the United States, then a manufacturer may look into selling them in Europe. However, the US and Europe use different frequency bands in the available cellular radio spectrum, and as a result, the frequency range(s) supported by the device's antenna must match the frequency range(s) in use by the device's transmitter in various geographical regions around the world.

Consequently, unless a manufacturer wants to spend money for an antenna that will work in both the US and Europe, he must buy one type of antenna for the parking meters to be sold in the US and another type of antenna for the parking meters to be sold in Europe. However, the radio transceiver in our parking meter example typically supports the bands used in Europe and the US.

It is conceivable that meters that are intended for the US may be deployed in Europe and vice-versa. Transmitting into an antenna that is not optimized for the bands the radio will use in the given geographical area can create performance issues, and in some cases cause the wireless device to violate regulatory requirements. Also, counterfeit antennas or unauthorized antennas may cause the transmitter to create excessive interference to wireless networks, resulting in poor end-user performance, and/or cause the device to exceed regulatory guidelines, including RF exposure.

Clearly, a mechanism is needed whereby the radio transceiver can have knowledge of the antenna's attributes so that the transmitter will only operate on bands supported by the antenna. A mechanism is needed that can identify unauthorized or counterfeit antennas used as part of an M2M integration.

SUMMARY OF THE SUBJECT DISCLOSURE

The subject disclosure solves the problems outlined above by using a transmitter to verify the attributes of its associated antenna. Exemplary embodiments of the subject disclosure employ a logical interface coupled to a transmitter to read key antenna attributes from a memory integrated within the device's antenna, and refuse transmission when the antenna capabilities are inappropriate for the frequency band(s) to be used by the transmitter. This mechanism can also be used to identify the presence of counterfeit antennae and inhibit transmission.

Exemplary embodiments of the subject disclosure include a tamper-proof means for providing antenna capability information to an associated radio transmitter and/or radio transceiver. Through this mechanism, the antenna communicates the frequency band(s) it supports as well as other antenna attributes which may be relevant to its associated radio transmitter/transceiver. The other key antenna attributes may be utilized as required by various integrations. Furthermore, the communication of the antenna's key electrical parameters and other antenna attributes to the associated transmitter/transceiver can optimize performance and avoid the potential of violating regulatory requirements.

Benefits to this solution include the ability of a wireless communication device to inhibit operation on bands not supported by the antenna, to determine whether lower power must be utilized in order to maintain compliance with regulatory requirements, such as RF exposure levels, to avoid instances of spurious emissions or other antenna-related anomalous behavior in some devices, and to identify the antenna manufacturer, the antenna model, and the antenna serial number. These abilities also become critical in cases where counterfeit or unauthorized antennas are being distributed. For example, counterfeit antennas or unauthorized antennas may cause the transmitter to create excessive interference to wireless networks resulting in poor end-user performance, and/or cause the device to exceed regulatory guidelines, including RF exposure. In exemplary embodiments, a network operator polls devices to obtain the antenna specifications to determine if unauthorized and/or counterfeit antennas have been deployed to the field.

In one exemplary embodiment, the present subject disclosure is a device for antenna verification. The device includes a transmitter in communication with an antenna, the antenna coupled with an antenna memory, the antenna memory including a set of pre-defined antenna attributes, and a logical interface on the transmitter which reads the antenna attributes, determines if the antenna attributes are in conflict with the transmitter, and refuses transmission through the transmitter.

In another exemplary embodiment, the present subject disclosure is a system for antenna verification. The system includes a network, an antenna verification server in communication with a wireless communication device through the network, the wireless communication device including a transmitter, the antenna verification server including an antenna database, and a remote verification logic on the server which requests the wireless communication device's antenna attributes from an antenna memory, the antenna memory coupled to an antenna, the antenna coupled to the wireless communication device, receives the antenna attributes, determines the antenna attributes to be in conflict with the transmitter, and refuses transmission through the network.

In yet another exemplary embodiment, the present subject disclosure is a method for verifying an antenna using a logical interface coupled with a transmitter. The method includes reading antenna attributes, the antenna attributes stored on an antenna memory, the antenna memory coupled with the antenna, determining the antenna attributes to be in conflict with the transmitter, and refusing transmission through the transmitter.

DETAILED DESCRIPTION OF THE SUBJECT DISCLOSURE

The present subject disclosure is a transmitter which verifies an antenna. Exemplary embodiments of the subject disclosure employ a logical interface coupled to a transmitter to read antenna attributes from a memory integrated with an antenna, and refuse transmission when the antenna attributes conflict with the requirements of the transmitter.

Disclosed is a, tamper-proof, read-only memory device physically located on or near an antenna structure that communicates with a wireless radio transmitter on a wireless communication device. This memory device includes at least the following six antenna attributes: frequency bands supported by the antenna, maximum antenna gain in dBi for each supported band, frequency range corresponding to the antenna's 3:1 voltage standing wave ratio (VSWR) limits, antenna manufacturer, antenna model, and antenna serial number. The antenna's memory device will provide these antenna attributes to the associated radio transmitter or transceiver using a read-only protocol that, because of its simplicity, should add little, if any, incremental cost to the transmitter or transceiver. A communications link between the transmitter and the antenna memory module must be maintained at all times, otherwise the transmitter/transceiver will be disabled. The antenna attributes contained in memory may be encrypted by the manufacturer and may contain a checksum so that changes to the data stored in the antenna's memory device are almost impossible to make once the antenna has left the manufacturer. The attributes from the antenna's read-only memory can be read by only the associated transmitter/transceiver, or also by the network operator to ensure that unauthorized antenna changes have not been made to any given wireless device.

"Wireless communication device", as used herein and throughout this disclosure, refers to any electronic device capable of wirelessly sending and receiving data. A wireless communication device may have a processor, a memory, a transmitter, an input, and an output. Examples of such devices include cellular telephones, personal digital assistants (PDAs), portable computers, machine to machine (M2M) integrations, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations, any digital IC, analog IC, etc., on a complementary metal-oxide-semiconductor (CMOS), silicon germanium (SiGe), silicon-on-insulator (SOI), etc. Logic may be formed from combinations of software and hardware. On a telecommunication network, logic may be programmed on a server, or a complex of servers. On small devices, logic may be programmed on logical interfaces such as Complementary Metal-Oxide-Semiconductor (CMOS), baseband processor, other forms of digital and analog IQ, etc. A particular logic unit is not limited to a single logical location on the telecommunication network.

Wireless communication devices communicate with each other and with other elements via a network, for instance, a wireless network, or a wireline network. A "network" can include broadband wide-area networks such as cellular networks, local-area networks (LAN), and personal area networks, such as near-field communication (NFC) networks or BLUETOOTH® networks. Communication across a network is preferably packet-based; however, radio networks can enable communication between wireless communication devices using appropriate analog modulation mechanisms, analog-digital-analog converters and other related elements. Communication is enabled by hardware elements called "transmitters." A transceiver is a transmitter coupled with a receiver. Every transceiver includes a transmitter. Wireless communication devices may have more than one transceiver, capable of communicating over different networks. For example, a cellular telephone can include a cellular transceiver for communicating with a cellular base station as part of a wide-area network, a Wi-Fi transceiver for communicating with a Wi-Fi network, and a BLUETOOTH® transceiver for communicating with a BLUETOOTH® device. A network typically includes a plurality of elements that host logic for performing tasks on the network.

For the following description, it can be assumed that most correspondingly labeled structures across the figures (e.g., 116 and 216, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figures 1, 2, 3:
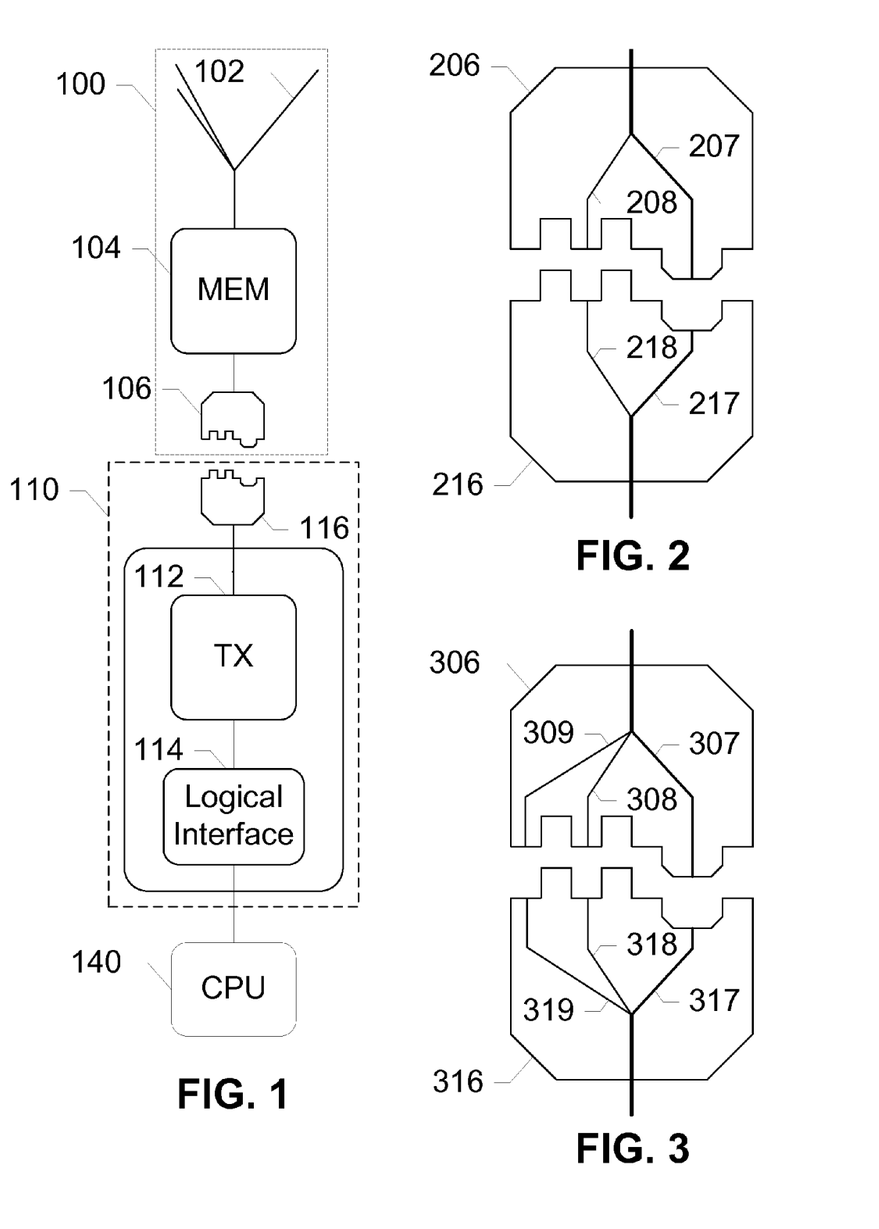
FIG. 1 shows an antenna and a transmitter for verifying the antenna, according to an exemplary embodiment of the subject disclosure.
FIG. 2 shows a connection between an antenna and a transmitter, according to an exemplary embodiment of the subject disclosure.
FIG. 3 shows a connection between an antenna and a transmitter, according to an exemplary embodiment of the subject disclosure.

FIG. 1 shows an antenna 100 and a transmitter 110 for verifying antenna 100, according to an exemplary embodiment of the subject disclosure. Antenna 100 includes a reception surface 102, an antenna memory 104, and an antenna connector 106. Reception surface 102 may be of any antenna design, such as omnidirectional, directional, monopole, dipole, etc. Antenna memory 104 is a read-only memory module integrated with antenna 100. Antenna memory 104 stores antenna specifications, including the frequency bands supported by the antenna, the maximum antenna gain for each supported frequency band, the frequency range for the antenna, the antenna manufacturer, the antenna model, the antenna serial number, etc. The antenna gain may be measured in decibels relative to an isotropic radiator (dBi), and the frequency range for the antenna may correspond to 3:1 VSWR limits.

Antenna connector 106 removably couples antenna 100 to a transmitter, such as transmitter 110. Transmitter 110 includes a transmitter module 112, a logical interface 114, and a transmitter connector 116. Transmitter module 112 receives analog signals from antenna 100 via transmitter connector 116, and converts them to digital signals before sending them to a processor 140. Logical interface 114 verifies antenna 100 prior to allowing communication by reading the antenna specification from antenna memory 104, and determines whether or not the antenna attributes are in conflict with transmitter 110. If the antenna attributes are in conflict with transmitter 110, for instance because the antenna supports a different frequency band than the transmitter or has a weak maximum gain, then transmission is refused. Logical interface 114 accomplishes these tasks through any digital IC, analog IC, etc., on a complementary metal-oxide-semiconductor (CMOS), silicon germanium (SiGe), silicon-on-insulator (SOI), etc. Transmitter connector 116 connects with antenna connector 106 to establish communication between transmitter 110 and antenna 100.

Although FIG. 1 shows a transmitter module and a logical interface separately, embodiments of the subject disclosure include at least the tasks of the logical interface within the transmitter module. These embodiments employ RF Integrated Circuits (RFIC), which are capable of high-bandwidth applications and complex logic. Many more technologies exist for both transmitters and logical interfaces, and suitable technologies will be readily apparent to those having skill in the art upon reading this disclosure.

In other embodiments of the subject disclosure, the transmitter is connected to an antenna without an antenna memory. In these embodiments, the logical interface, upon failing to detect any antenna memory, immediately refuses transmission.

FIG. 2 shows a connection between an antenna and a transmitter, according to an exemplary embodiment of the subject disclosure. The connection is between an antenna connector 206 and a transmitter connector 216. Antenna connector 206 includes a power lead 207 and an RF signal lead 208, and transmitter connector 216 includes a power lead 217 and an RF signal lead 218. These leads are connected, respectively, when antenna connector 206 and transmitter connector 216 are connected. In this embodiment, communication with an antenna memory is achieved through RF signal leads 208 and 218.

FIG. 3 shows a connection between an antenna and a transmitter, according to another exemplary embodiment of the subject disclosure. The connection is between an antenna connector 306 and a transmitter connector 316. Antenna connector 306 includes a power lead 307, an RF signal lead 308, and a data lead 309, and transmitter connector 316 includes a power lead 317, an RF signal lead 318, and a data lead 319. These leads are connected, respectively, when antenna connector 306 and transmitter connector 316 are connected. In this embodiment, communication with an antenna memory is achieved through data leads 309 and 319, which may serve as a dedicated connection from the transmitter to the antenna memory.

Other embodiments of the subject disclosure employ vastly different connectors using more complex and different electrical arrangements between an antenna and a transmitter. Some of these embodiments use the existing architecture of the connection to facilitate communication between the transmitter and an antenna memory, while other embodiments include an additional communication line for dedicated or supplemental communication between the transmitter and the antenna memory.

Figure 4:
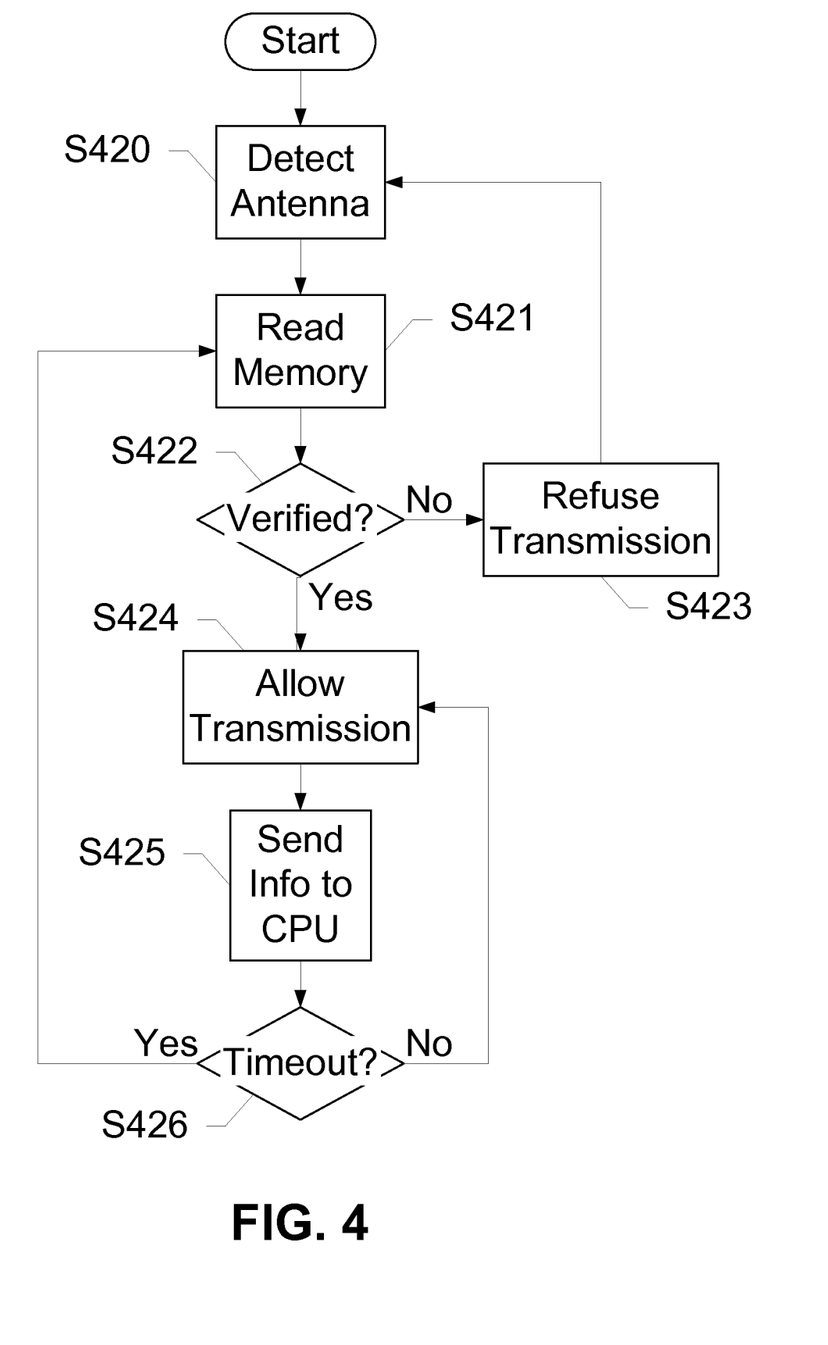
FIG. 4 shows a method for verifying an antenna via a transmitter, according to an exemplary embodiment of the subject disclosure.

FIG. 4 shows a method for verifying an antenna via a transmitter, according to an exemplary embodiment of the subject disclosure. This method is performed by a logical interface of a transmitter or a transceiver as it verifies the antenna. First, the connection to the antenna is detected S420. As soon as the antenna is connected, the antenna memory is read S421, revealing the antenna specification(s). The antenna memory may be read S421, for instance, via a connector that couples with the antenna memory. The antenna attributes are read from the memory then verified to ensure the transmitter will operate efficiently and legally S422. If any antenna attributes are in conflict with the requirements of the transmitter, such as by supporting a frequency band that differs from the transmitter, having a weak maximum gain, etc., then transmission is refused S423. If none of the antenna attributes are in conflict with the requirements of the transmitter, then transmission is allowed S424. Once transmission is allowed, a processor is notified of the antenna attributes, and the allowance of transmission S425. The processor is most likely coupled with a wireless communication device including the transmitter. To ensure that a faulty or illegal antenna is not simply swapped at this point, the verification process is periodically repeated via a timeout S426. In other words, once enough time has passed, the antenna memory is read again S421, and the process repeats. If enough time has not passed, transmission continues S424. Transmission is allowed during subsequent verification processes until a refusal of transmission is warranted by conflicting antenna attributes in step S422.

In some embodiments of the subject disclosure, verification of the transmitter is required to read the antenna attributes from the antenna memory. Further, communication between the antenna memory and the transmitter is encrypted. Other security forms and methods will be recognizable to those having skill in the art upon reading this disclosure. Some exemplary embodiments only include an antenna and a transmitter without using a processor. The transmitter includes any logic and other components necessary to refuse communication with the network via a conflicting antenna.

As mentioned briefly above, there are several types of devices and objects in existence that could benefit from having incorporated within them the features described in the subject disclosure. One such device is a parking meter that communicates with a central authority via a wireless connection. Manufacturers of such devices need to be able to provide parking meters with an antenna specific to the type of network used by the central authority, and the subject disclosure solves this need.

Figures 5A, 5B:
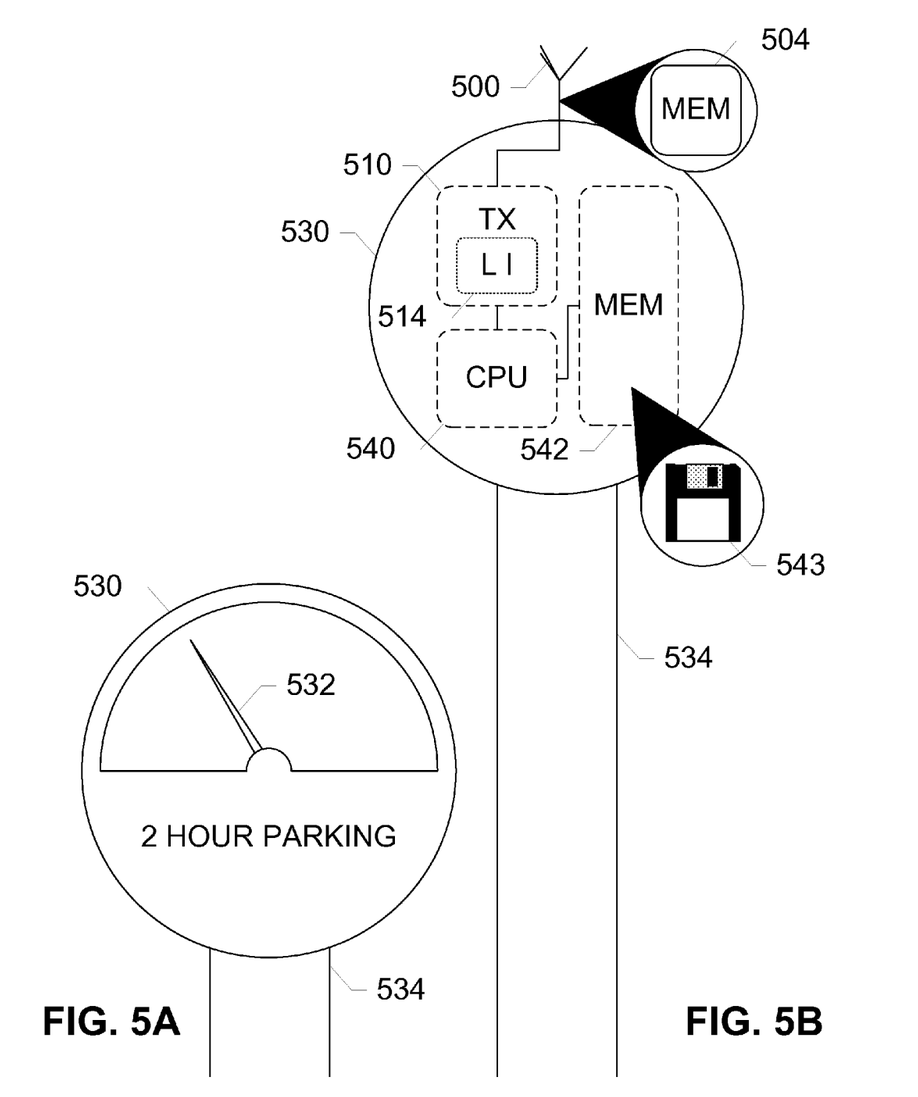
FIG. 5A shows a parking meter for wireless communication, according to an exemplary embodiment of the subject disclosure.
FIG. 5B shows a parking meter for verifying an antenna via a transmitter, according to an exemplary embodiment of the subject disclosure.

FIGS. 5A and 5B show a parking meter 530 for wireless transmission, according to an exemplary embodiment of the subject disclosure. Parking meter 530 includes an antenna 500, a meter 532, and a stand 534. Externally, parking meter 530 appears as a standard parking meter recognizable to those having skill in the art. Parking meter 530 transmits information concerning usage and integrity to a central monitoring station through antenna 500. Meter 532 displays the amount of time remaining. Stand 534 supports parking meter 530, and is fixed to the ground.

FIG. 5B shows the components of a parking meter 530 for verifying an antenna via transmitter, according to an exemplary embodiment of the subject disclosure. These components include an antenna 500 including an antenna memory 504, a transmitter 510 including a logical interface 514, a processor 540, and a meter memory 542 including a meter logic 543. When parking meter 530 is powered, either by a battery or via an external power source (not shown), antenna 500 is verified by transmitter 510. Processor 540 executes meter logic 543 at the same time, but must wait for transmission to be allowed to proceed with the wireless transmission. Meter logic 543 evaluates the usage and integrity of parking meter 530, and then transmits this information concerning usage and integrity to a central monitoring station. Transmitter 510 verifies antenna 500, then notifies processor 540 of the allowance of transmission, so that processor 540 can begin the wireless transmission.

In other embodiments, the antenna attributes are included in the notification of transmission allowance. This way, the processor 540 is positively notified of transmission ability, and can store a record of the antenna attributes in memory 542.

Figure 6:
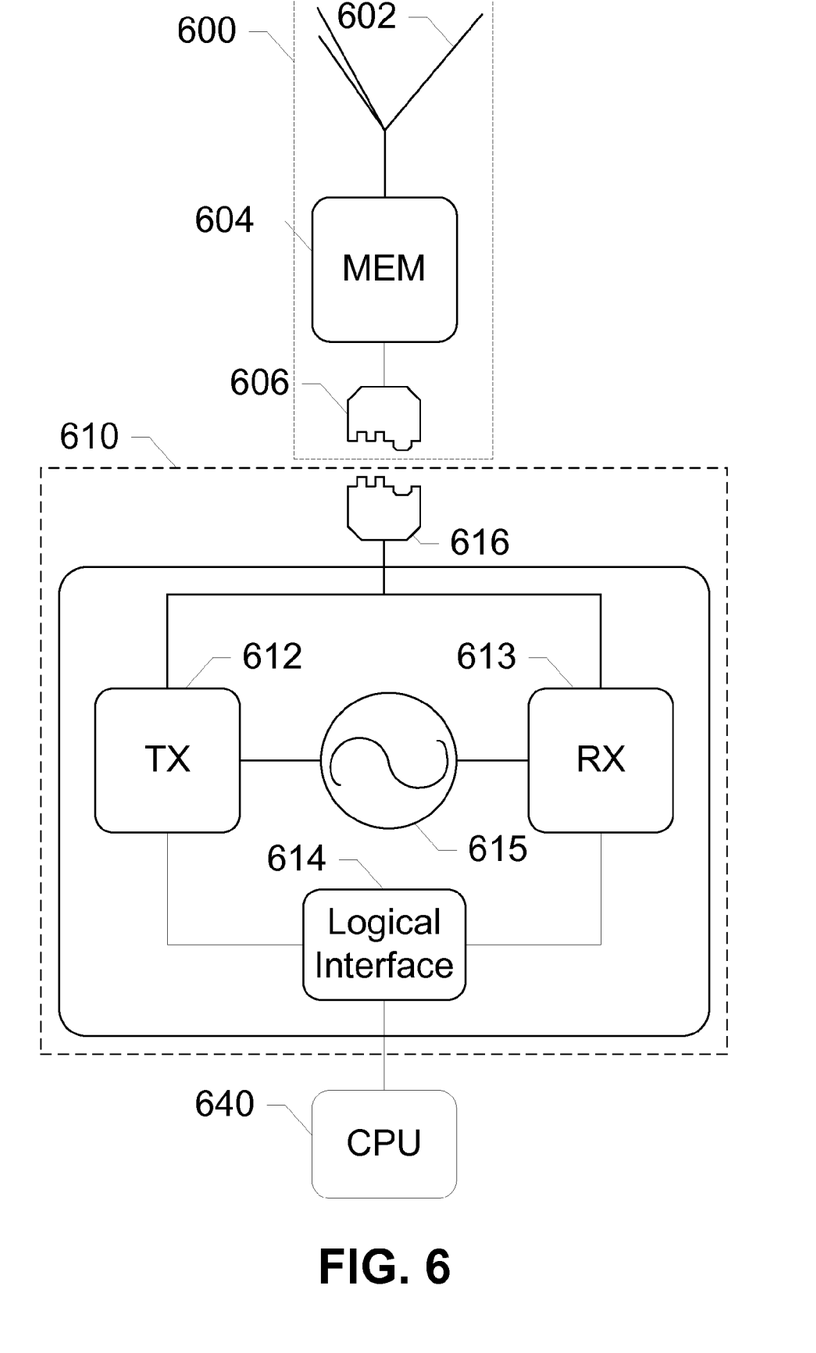
FIG. 6 shows an antenna and a transceiver for verifying the antenna, according to an exemplary embodiment of the subject disclosure.

FIG. 6 shows an antenna 600 and a transceiver 610 for verifying antenna 600, according to an exemplary embodiment of the subject disclosure. Antenna 600 includes a reception surface 602, an antenna memory 604, and an antenna connector 606. Reception surface 602 may be of any antenna design, such as omnidirectional, directional, monopole, dipole, etc. Antenna memory 604 is a read-only memory module integrated with the antenna. Antenna memory 604 stores antenna attributes, such as the frequency bands supported by the antenna, the maximum antenna gain in dBi for each supported band, the frequency range corresponding to the antenna's 3:1 VSWR limits, the antenna manufacturer, the antenna model, the antenna serial number, etc. Antenna connector 606 is used to connect antenna 600 to a transceiver, such as transceiver 610, by connecting to transceiver connector 616. Transceiver 610 includes a transmitter module 612, a receiver module 613, a logical interface 614, a voltage controlled oscillator (VCO) 615, and a transceiver connector 616. Receiver module 613 receives analog signals from antenna 600 and converts them to digital signals before sending them to a processor 640. Transmitter module 612 receives digital signals from processor 640 and converts them to analog signals before sending them to antenna 600. Logical interface 614 adds the task of verifying the antenna prior to allowing communication by reading the antenna attributes and determining whether or not the antenna attributes are in conflict with the requirements of the transmitter. If the antenna specification is in conflict with the transmitter, such as supporting a frequency band other than that supported by the transmitter, having a weak maximum gain, etc., then transmission is refused. Logical interface 614 accomplishes these tasks through any typical logic, digital IC, analog IC, etc., on a complementary metal-oxide-semiconductor (CMOS), silicon germanium (SiGe), silicon-on-insulator (SOI), etc. VCO 615 provides the transmitter module 612 and receiver module 613 with the input frequency(s) necessary to support communication with the desired radio network. Transceiver connector 616 connects with antenna connector 606 to establish communication between transceiver 610 and antenna 600.

Although FIG. 6 shows a transmitter module, a receiver module, and a logical interface separately, embodiments of the subject disclosure include at least the tasks of the logical interface within the transmitter module and receiver module. These embodiments employ RF Integrated Circuits (RFIC), which are capable of high-bandwidth applications and complex logic. Many more technologies exist for transmitters, receivers, and logical interfaces. Other suitable technologies will be readily apparent to those having skill in the art upon reading this disclosure.

Figures 7A, 7B:
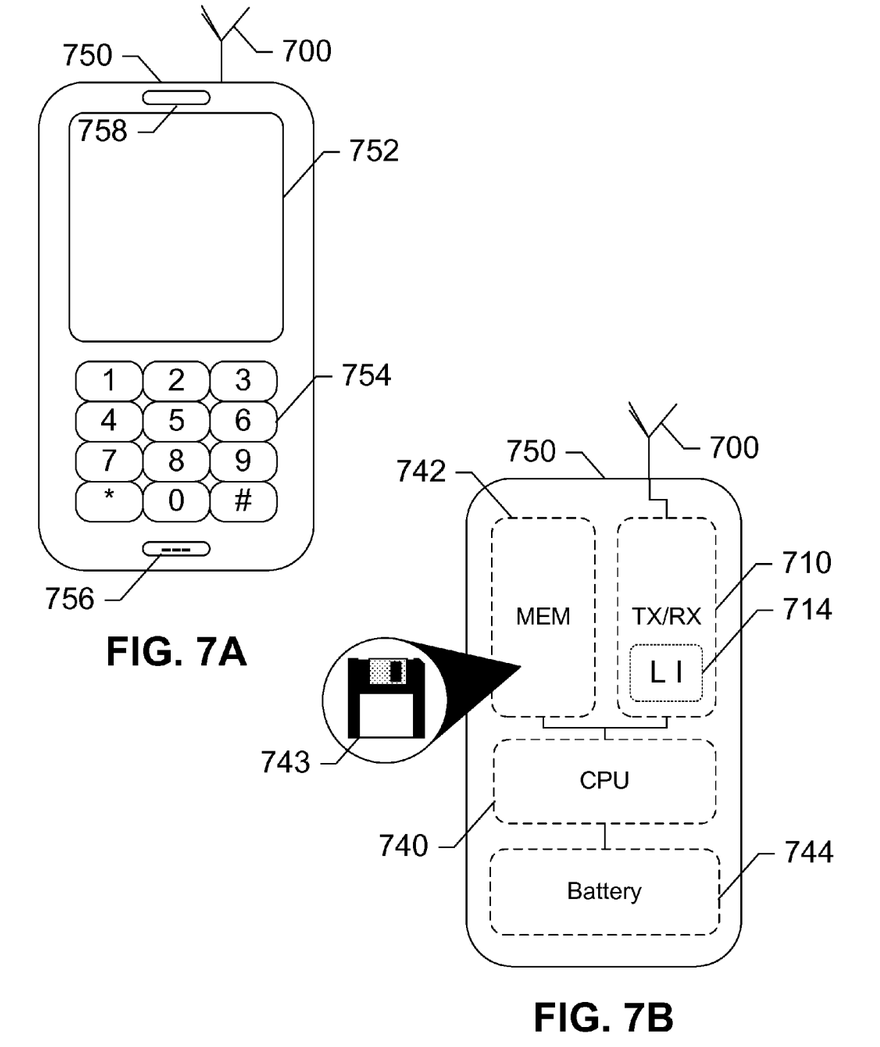
FIG. 7A shows a wireless communication device for verifying an antenna via a transceiver, according to an exemplary embodiment of the subject disclosure.
FIG. 7B shows the inner components of a wireless communication device for verifying an antenna via a transceiver, according to an exemplary embodiment of the subject disclosure.

FIG. 7A shows external components of a wireless communication device 750 for verifying an antenna 700 via a transceiver, according to an exemplary embodiment of the subject disclosure. In this exemplary embodiment, wireless communication device 750 includes a display 752, a keypad 754, a microphone 756, a speaker 758, and an antenna 700. Display 752 is a liquid crystal display (LCD) that serves as a visual output for the user. Display 752 is used to display, among other things, notifications of conflicting antennas, and the resulting lack of communication. Keypad 754 is an input for entering information and commands to wireless communication device 750. Microphone 756 accepts aural input and allows wireless communication device 750 to deliver voice communication to the network and other wireless communication devices. Speaker 758 outputs audio, such as for conflicting antenna alerts, and also allows voice communication with other wireless communication devices. Antenna 700 sends and receives wireless radio frequency (RF) signals to and from wireless networks, network nodes, and other wireless devices.

FIG. 7B shows the internal components of a wireless communication device 750 for verifying an antenna 700 via a transceiver 710, according to an exemplary embodiment of the subject disclosure. The internal components of wireless communication device 750 include a processor 740, a memory 742 storing a verification response logic 743, a transceiver 710 including a logical interface 714, and a battery 744. Processor 740 receives input and issues commands to deliver output through the other components. Memory 742 stores information including logic for enabling processor 740 to operate the other components of wireless communication device 750, and further stores verification response logic 743. Verification response logic 743 responds to verification requests from a verification server on a network with antenna attributes for antenna 700. Transceiver 710 converts wireless signals received by antenna 700 to information capable of processing by processor 740, and vice-versa, and to communicate with a network and other wireless communication devices. Transceiver 710 uses one or more wireless protocols including, GSM, GPRS, W-CDMA, LTE, WiFi, BLUETOOTH, ZIGBEE, Z-WAVE, etc., to communicate with wide-area network nodes and/or other wireless communication devices within range. Logical interface 714 adds the task of verifying antenna 700 prior to allowing communication by reading the antenna attributes, and determining whether or not the antenna attributes are in conflict with transceiver 710. Battery 744 powers wireless communication device 750, and may be rechargeable via an external power source.

There are many embodiments of a wireless communication device that are capable of being used in accordance with the present subject disclosure. In other embodiments of the wireless communication device, other displays are used, such as an LED display, OLED display, etc. In some embodiments, the display is used as a touch-sensitive input device, i.e. a touch screen. A touch screen allows the user to view output on the display as well as use the display to provide input. In some touch screen embodiments the mobile device may not have a physical keypad for input. Instead, a virtual keypad is displayed on the touch screen and the user inputs by touching the virtual keys. Other forms of input such as full keyboards, accelerometers, motion sensors, etc., may be utilized in the wireless communication device. The memory may be a non-removable internal memory, or a removable memory such as in a subscriber identity module (SIM) card or a memory card inserted into a memory card reader. Many mobile devices have more than one transceiver or a transceiver that supports more than one protocol. For instance, it is not uncommon for a mobile device to support cellular radio frequency (RF), NFC, WiFi, BLUETOOTH®, ZIGBEE®, and Z-WAVE® protocols. A wireless communication device involving multiple modes of wireless communications, such as cellular, WiFi, NFC, etc., may contain a plurality of antennas on a single device. For example, an NFC-enabled wireless communication device has separate antennas for cellular and NFC communications respectively.

Figure 8:
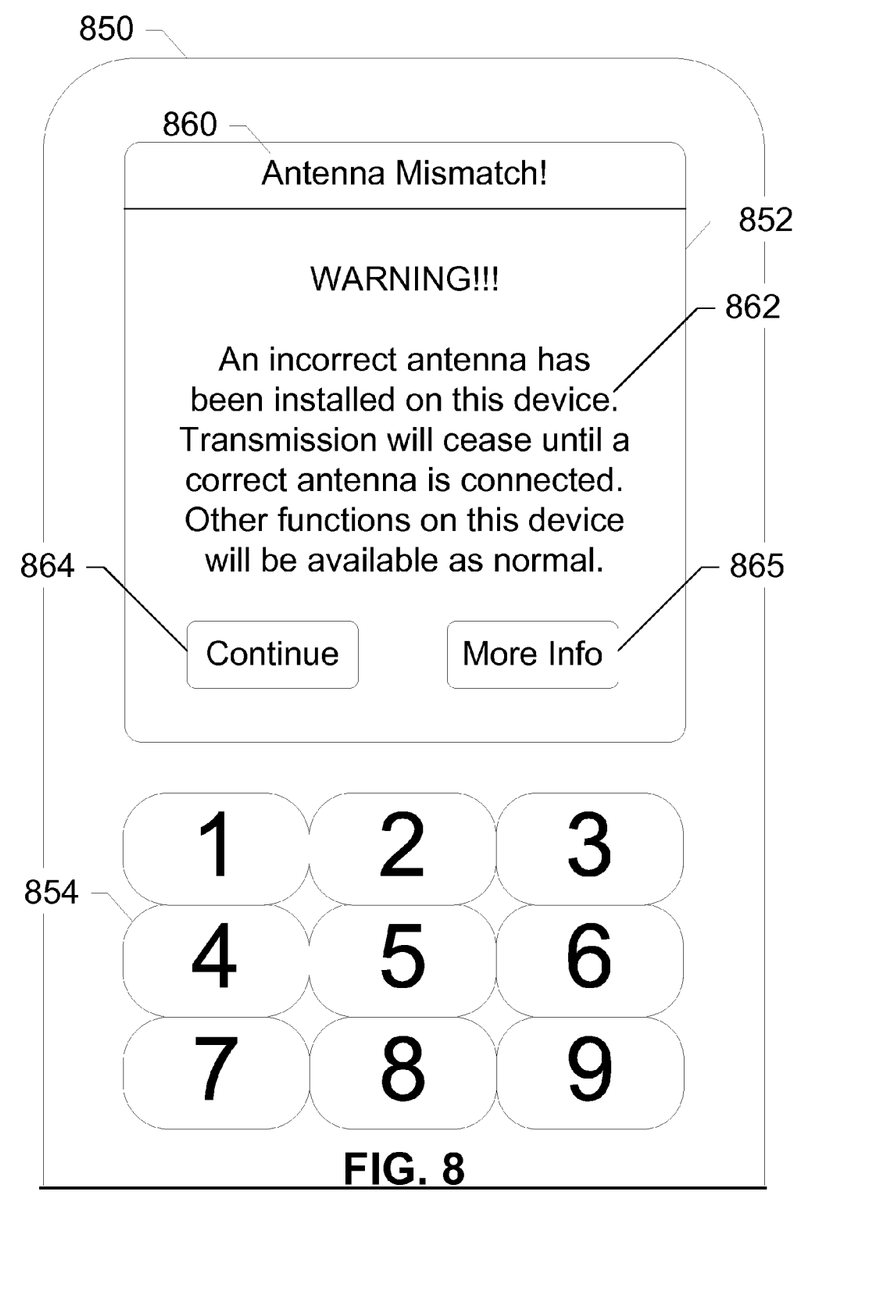
FIG. 8 shows a user alert for an antenna mismatch determination on a wireless communication device, according to an exemplary embodiment of the subject disclosure.

FIG. 8 shows a user alert 860 for an antenna mismatch determination on a wireless communication device 850, according to an exemplary embodiment of the subject disclosure. User alert 860 is output onto display 852, and includes a message 862, a "continue" button 864, and a "more info" button 865. Message 862 informs the user that transmission will not operate with the current antenna. Buttons 864 and 865 are activated using keypad 854. Activating "continue" button 864 closes user alert 860, and allows the user to continue to use wireless communication device 850 without communication. Activating "more info" button 865 inserts more information into message 862, such as instructions on how to acquire a correct antenna, etc.

Embodiments of a wireless communication device which employ a touch screen display may not have a keypad to activate buttons. Activation is instead accomplished by touching the touch screen display in these embodiments.

Figure 9:
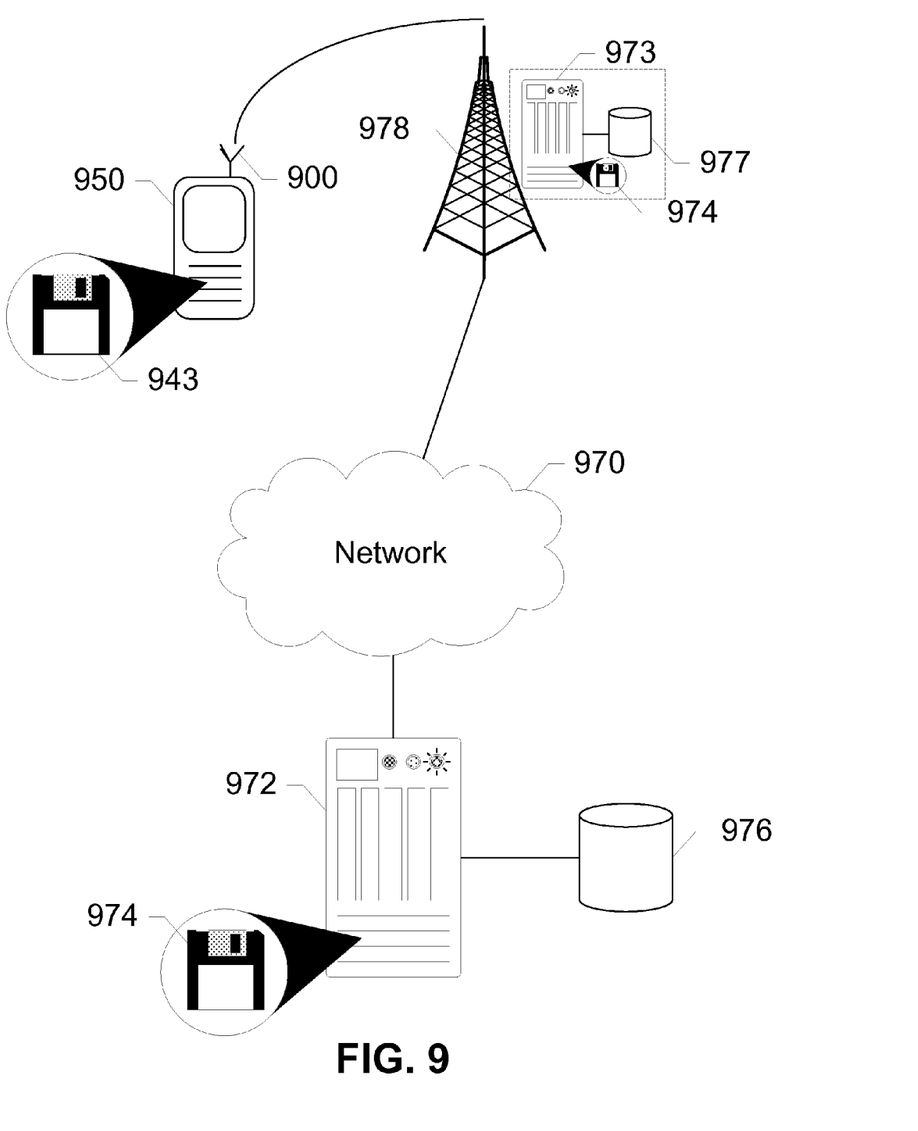
FIG. 9 shows a system for remote verification of an antenna, according to an exemplary embodiment of the subject disclosure.

FIG. 9 shows a system for remote verification of an antenna, according to an exemplary embodiment of the subject disclosure. The system includes a wireless communication device 950, a base station 978, a network 970, an antenna verification server 972 having a remote verification logic 974, and an antenna database 976. Wireless communication device includes an antenna 900 and a verification response logic 943. Wireless communication device 950 uses antenna 900 to communicate with network 970 via base station 978. Base station 978 serves a geographic area with communication to network 970. Network 970 is a wide-area network facilitating communication between many devices, servers, etc., nationwide. Antenna verification server 972 periodically checks the antenna attributes of wireless communication device 950. Remote verification logic performs this function by transmitting a remote verification request for the antenna attributes to wireless communication device 950, receiving the antenna attributes from wireless communication device 950, and determining whether or not the antenna attributes are in conflict with the transmitter's requirements. Antenna database 976 stores antenna attributes for many types of wireless communication devices, including wireless communication device 950. If any antenna attributes are found to be in conflict with the transmitter's capabilities, such as by supporting a different frequency band than the transmitter, having a low maximum gain, etc., then further transmission through the network is refused.

In an alternate exemplary embodiment, each base station has an antenna verification server 973 including a remote verification logic 974 and an antenna database 977. Antenna verification server 973 may be included instead of or in addition to antenna verification server 972. Antenna verification server 973 performs substantially the same tasks as antenna verification server 972, but only over the geographical area covered by base station 978.

Figure 10:
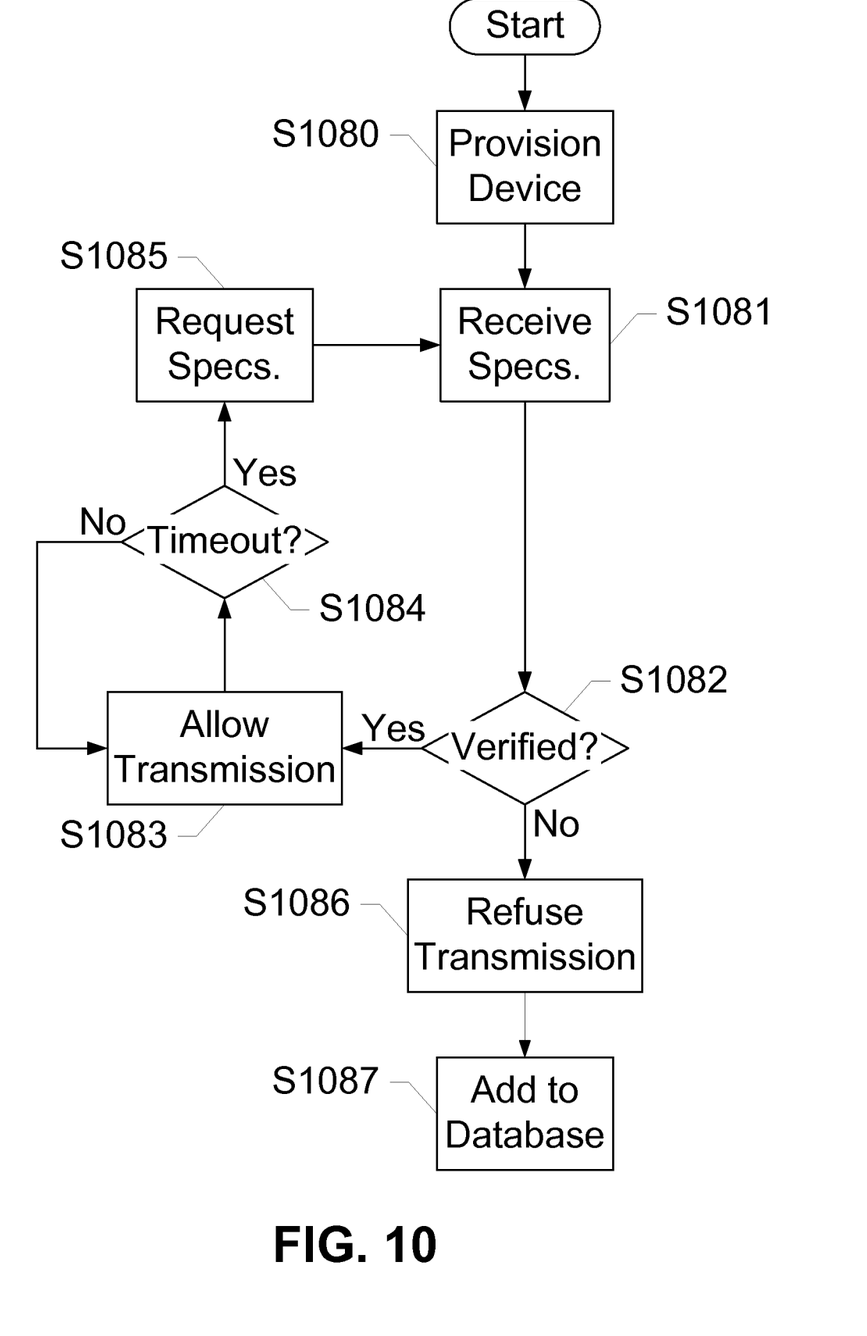
FIG. 10 shows a method for remote verification of an antenna, according to an exemplary embodiment of the subject disclosure.

FIG. 10 shows a method for remote verification of an antenna by an antenna verification server on a network, according to an exemplary embodiment of the subject disclosure. The method begins when a wireless communication device connected to the antenna is provisioned by the network S1080. Provisioning typically happens when a wireless communication device first contacts a network, such as when the wireless communication device is powered, or receives a network signal. Once the wireless communication device is provisioned, antenna attributes are received by the network from the wireless communication device S1081 via the antenna. Once the antenna attributes are received, the antenna can be verified by the antenna verification server S1082. If none of the antenna attributes are in conflict with the requirements of the transmitter, or if the antenna is compliant with the requirements of the transmitter, then transmission is allowed S1083. After the initial transmission allowance, the antenna verification server must periodically verify the antenna using a timeout S1084. In other words, after enough time has passed, the verification server makes a request for antenna attributes S1085, which is followed by another verification S1082. If enough time has not passed, transmission continues to be allowed S1083. If at this time or during any verifications any antenna attributes are in conflict with the requirements of the transmitter, then transmission is refused S1086. In this case, an identifier of the wireless communication device is added to a database which logs devices registering conflicting antennas S1087.

Figure 11:
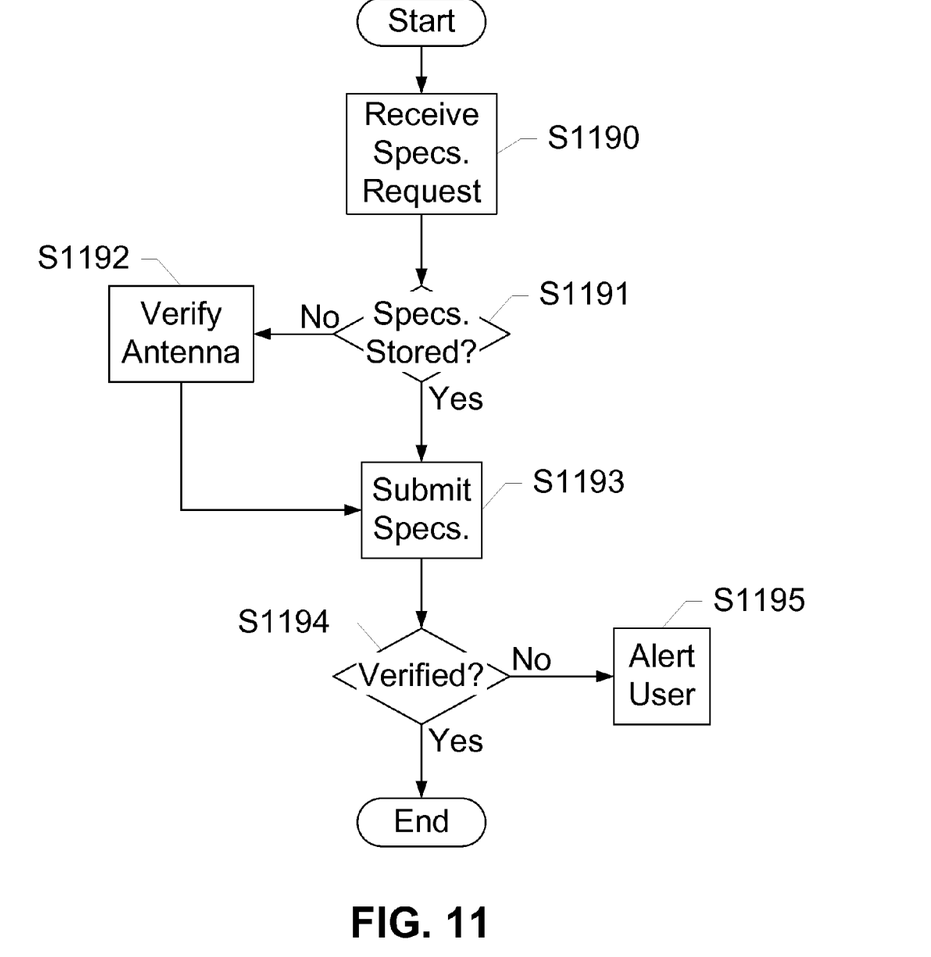
FIG. 11 shows a method for responding to a request for verification of an antenna, according to an exemplary embodiment of the subject disclosure.

FIG. 11 shows a method for responding to a request for verification of an antenna, according to an exemplary embodiment of the subject disclosure. The method begins when a wireless communication device receives a request for antenna attributes from an antenna verification server S1190. The wireless communication device may have the antenna attributes stored in memory from a previous verification. The wireless communication device checks the memory for antenna attributes S1191. If the antenna attributes are not stored, then the wireless communication device must perform an antenna verification locally to acquire the antenna attributes S1192. Once the antenna attributes are stored in the memory, then the antenna attributes are submitted to the antenna verification server S1193. At this point, the wireless communication device is aware of whether or not the antenna is verified S1194. If it is not verified, then the user is alerted S1195. If the antenna passes verification, then communication will continue.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A transmitter comprising:
a transmitter connector;
a transmitter module; and
a logical interface for performing operations comprising
detecting a connection with an antenna via the transmitter connector, and verifying the antenna, wherein verifying the antenna comprises
reading, from an antenna memory associated with the antenna, antenna attributes associated with the antenna,
determining whether any of the antenna attributes conflicts with any requirements of the transmitter,
in response to determining that an antenna attribute conflicts with a requirement of the requirements of the transmitter, refusing transmission through the transmitter, and
in response to determining that the antenna attributes comply with the requirements of the transmitter, providing, to a processor of a wireless communication device associated with the transmitter, a notification of transmission allowance to allow the processor of the wireless communication device to begin a wireless transmission.

2. The transmitter of claim 1, wherein the transmitter connector connects to an antenna connector coupled with the antenna, wherein a connection between the antenna connector and the transmitter connector establishes the connection with the antenna and establishes communication between the transmitter and the antenna.

3. The transmitter of claim 2, wherein the connection between the antenna connector and the transmitter connector facilitates communication between the antenna memory and the logical interface.

4. The transmitter of claim 2, wherein the connection between the antenna connector and the transmitter connector includes a radio frequency signal lead and a power lead.

5. The transmitter of claim 4, wherein the connection between the antenna connector and the transmitter connector further includes a data lead.

6. The transmitter of claim 1, further comprising a receiver in communication with the antenna.

7. The transmitter of claim 1, wherein the operations further comprise including the antenna attributes associated with the antenna in the notification of transmission allowance provided to the processor of the wireless communication device.

8. An antenna verification server comprising:
a processor; and
a memory storing instructions that, when executed by the processor, cause the processor to perform operations comprising
transmitting, to a wireless communication device, a remote verification request, the remote verification request requesting antenna attributes associated with an antenna of the wireless communication device,
receiving, from the wireless communication device, the antenna attributes associated with the antenna of the wireless communication device,
verifying the antenna of the wireless communication device, wherein verifying the antenna of the wireless communication device comprises determining whether an antenna attribute of the antenna attributes associated with the antenna of the wireless communication device is in conflict with a requirement of requirements of a transmitter associated with the wireless communication device, and
in response to determining that an antenna attribute conflicts with a requirement of the requirements of the transmitter, refusing transmission associated with the wireless communication device.

9. The antenna verification server of claim 8, wherein the operations further comprise adding an identifier of the wireless communication device to a database in response to determining that an antenna attribute conflicts with a requirement of the requirements of the transmitter.

10. The antenna verification server of claim 8, wherein the antenna attributes comprise at least one of frequency bands supported by the antenna, a maximum antenna gain of each of the frequency bands supported, or a frequency range for the antenna.

11. The antenna verification server of claim 8, wherein the operations further comprise in response to determining that the antenna attributes comply with the requirements of the transmitter, allowing transmission associated with the wireless communication device.

12. The antenna verification server of claim 8, wherein the operations further comprise transmitting, to the wireless communication device, an additional remote verification request after a period of time passes from transmitting the remote verification request, the additional remote verification request requesting the antenna attributes associated with the antenna of the wireless communication device.

13. A method comprising:
transmitting, from an antenna verification server comprising a processor to a wireless communication device, a remote verification request, the remote verification request requesting antenna attributes associated with an antenna of the wireless communication device;
receiving, by the antenna verification server from the wireless communication device, the antenna attributes associated with the antenna of the wireless communication device;
verifying, by the antenna verification server, the antenna of the wireless communication device, wherein verifying the antenna of the wireless communication device comprises determining whether any antenna attribute of the antenna attributes associated with the antenna of the wireless communication device is in conflict with any requirements of a transmitter associated with the wireless communication device; and
in response to determining that an antenna attribute conflicts with a requirement of the requirements of the transmitter associated with the wireless communication device, refusing transmission associated with the wireless communication device.

14. The method of claim 13, further comprising adding, by the antenna verification server, an identifier of the wireless communication device to a database in response to determining that the antenna attribute conflicts with the requirement of the requirements of the transmitter.

15. The method of claim 13, wherein the antenna attributes comprise at least one of frequency bands supported by the antenna, a maximum antenna gain of each of the frequency bands supported, or a frequency range for the antenna.

16. The method of claim 13, further comprising in response to determining that the antenna attributes comply with the requirements of the transmitter, allowing, by the antenna verification server, transmission associated with the wireless communication device.

17. The method of claim 13, further comprising transmitting, by the antenna verification server to the wireless communication device, an additional remote verification request after a period of time passes from transmitting the remote verification request, the additional remote verification request requesting the antenna attributes associated with the antenna of the wireless communication device.

\* \* \* \* \*